US009134022B2

(12) United States Patent
Hunsinger

(10) Patent No.: US 9,134,022 B2
(45) Date of Patent: Sep. 15, 2015

(54) METHOD AND DEVICE FOR REDUCING HAZARDOUS EMISSIONS IN INTERNAL COMBUSTION SYSTEMS

(75) Inventor: Hans Hunsinger, Weingarten, DE (US)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 929 days.

(21) Appl. No.: 13/126,803

(22) PCT Filed: Oct. 28, 2009

(86) PCT No.: PCT/EP2009/007690
§ 371 (c)(1),
(2), (4) Date: Jul. 13, 2011

(87) PCT Pub. No.: WO2010/049127
PCT Pub. Date: May 6, 2010

(65) Prior Publication Data
US 2012/0129109 A1    May 24, 2012

(30) Foreign Application Priority Data

Oct. 30, 2008    (DE) .......................... 10 2008 054 038

(51) Int. Cl.
*F23L 7/00* (2006.01)
*F23B 80/02* (2006.01)
(Continued)

(52) U.S. Cl.
CPC . *F23B 80/02* (2013.01); *F23C 6/04* (2013.01); *F23C 9/06* (2013.01); *F23G 5/165* (2013.01);
(Continued)

(58) Field of Classification Search
CPC .......... F23G 5/006; F23G 5/14; F23G 5/085; F23G 5/165; F23G 2205/20; F23G 2209/12; F23G 2209/26; F23G 2209/30; F23G 2209/14; F23G 2201/70; F23G 2201/304; F23G 7/10; F23G 7/068; F23G 7/105; F23G 2900/00001; F23G 2206/10; F23G 2202/106; F23L 2900/07005; F23L 7/00; F23J 2217/102; F23J 2219/80; F23J 15/025; F23J 15/027; F23J 15/06; F23C 9/06; F23C 6/047; F23B 5/00; F23B 90/04; F23B 80/02; Y02E 20/12; Y02E 20/344; Y02E 20/346; Y02E 20/363

USPC ..................... 431/2; 432/14, 15, 58
See application file for complete search history.

(56) References Cited

U.S. PATENT DOCUMENTS 3,675,600 A * 7/1972 Jones ............................ 110/203
3,728,440 A * 4/1973 Hamblin ....................... 423/571
(Continued)

FOREIGN PATENT DOCUMENTS

AT          240502 B       6/1965
CA         2222958 A1      6/1998
(Continued)

OTHER PUBLICATIONS

T. Webster and Mrs. Parkes, "The American Family Encyclopedia of Useful Knowledge," 1856, published by J. C. Derby. see p. 472.*
(Continued)

*Primary Examiner* — Gregory Huson
*Assistant Examiner* — Martha Becton
(74) *Attorney, Agent, or Firm* — Leydig, Voit & Mayer, Ltd.

(57) ABSTRACT

A method for reducing pollutant emissions uses a two-stage primary combustion process for a solid-containing fuel including a primary furnace having a combustion chamber, a solid fuel burnout zone and a primary flue-gas post combustion chamber, and a separate secondary combustion train. The fuel is burned in the primary combustion chamber while supplying primary gas in a substoichiometric amount so as to form high heating-value gas and low-carbon solid residue. A partial stream of this gas is diverted and the remainder is passed to the post-combustion chamber. The diverted stream is passed to the secondary combustion train, which includes a conditioner, a secondary combustion chamber and an energy recovery device. Energy-spent exhaust gas from the train is recirculated to the furnace upstream of the post-combustion chamber in which it is burned with the remainder of the high heating value gas and an oxygen-containing gas supplied in superstoichiometric amounts.

15 Claims, 10 Drawing Sheets

(51) Int. Cl.
*F23C 6/04* (2006.01)
*F23C 9/06* (2006.01)
*F23G 5/16* (2006.01)
*F23G 7/06* (2006.01)
*F23G 7/10* (2006.01)
*F23J 15/02* (2006.01)
*F23J 15/06* (2006.01)

(52) U.S. Cl.
CPC *F23G 7/065* (2013.01); *F23G 7/10* (2013.01); *F23J 15/022* (2013.01); *F23J 15/06* (2013.01); *F23C 2202/00* (2013.01); *F23G 2202/103* (2013.01); *F23G 2202/106* (2013.01); *F23G 2209/14* (2013.01); *F23G 2209/26* (2013.01); *F23G 2900/00001* (2013.01); *F23J 2217/00* (2013.01); *F23J 2219/80* (2013.01); *Y02E 20/12* (2013.01); *Y02E 20/344* (2013.01); *Y02E 20/363* (2013.01)

(56) References Cited

U.S. PATENT DOCUMENTS

| | | | | |
|---|---|---|---|---|
| 3,728,441 | A * | 4/1973 | Hamblin | 423/571 |
| 3,918,373 | A * | 11/1975 | Fritz et al. | 110/189 |
| 3,927,627 | A * | 12/1975 | Brunn | 110/342 |
| 3,989,010 | A * | 11/1976 | Arps | 122/1 R |
| 4,118,204 | A * | 10/1978 | Eakman et al. | 48/197 R |
| 4,270,467 | A * | 6/1981 | Drake | 110/216 |
| 4,312,280 | A * | 1/1982 | Shearer et al. | 110/347 |
| 4,441,959 | A * | 4/1984 | Empie, Jr. | 588/320 |
| 4,509,436 | A * | 4/1985 | Schrofelbauer et al. | 110/345 |
| 4,642,225 | A * | 2/1987 | Leikert | 423/244.06 |
| 4,867,955 | A * | 9/1989 | Johnson | 423/244.07 |
| 5,103,742 | A * | 4/1992 | Valentino | 110/215 |
| 5,123,364 | A * | 6/1992 | Gitman et al. | 110/346 |
| 5,205,227 | A | 4/1993 | Khinkis | |
| 5,535,687 | A * | 7/1996 | Khanna | 110/345 |
| 5,695,723 | A * | 12/1997 | Valentino | 422/177 |
| 5,797,332 | A | 8/1998 | Keller | |
| 5,937,652 | A * | 8/1999 | Abdelmalek | 60/648 |
| 6,133,499 | A * | 10/2000 | Horizoe et al. | 110/234 |
| 6,336,415 | B1 | 1/2002 | Rueegg | |
| 6,677,765 | B2 * | 1/2004 | Breen et al. | 324/691 |
| 6,783,744 | B2 * | 8/2004 | Myerson et al. | 423/101 |
| 6,863,878 | B2 * | 3/2005 | Klepper | 423/650 |
| 6,935,251 | B2 * | 8/2005 | Marin et al. | 110/204 |
| 7,678,164 | B2 * | 3/2010 | Williams | 48/66 |
| 7,842,264 | B2 * | 11/2010 | Cooper et al. | 423/210 |
| 7,910,076 | B2 * | 3/2011 | Malavasi et al. | 423/210 |
| 8,070,863 | B2 * | 12/2011 | Tsangaris et al. | 96/108 |
| 8,443,584 | B2 * | 5/2013 | Draper et al. | 60/39.52 |
| 2004/0208813 | A1 * | 10/2004 | Brooks et al. | 423/355 |
| 2005/0109603 | A1 * | 5/2005 | Graham | 201/25 |
| 2005/0169824 | A1 * | 8/2005 | Downs et al. | 423/210 |
| 2006/0052902 | A1 * | 3/2006 | Lefebvre et al. | 700/266 |
| 2006/0196398 | A1 * | 9/2006 | Graham | 110/267 |
| 2007/0187223 | A1 * | 8/2007 | Graham | 201/25 |
| 2007/0234702 | A1 * | 10/2007 | Hagen et al. | 60/39.01 |
| 2008/0063992 | A1 | 3/2008 | Martin | |
| 2008/0173176 | A1 * | 7/2008 | Duesel et al. | 95/226 |
| 2008/0210089 | A1 * | 9/2008 | Tsangaris et al. | 95/90 |
| 2008/0236458 | A1 | 10/2008 | Hunsinger | |
| 2009/0020048 | A1 | 1/2009 | Hunsinger | |
| 2009/0077971 | A1 | 3/2009 | Schu | |
| 2009/0208395 | A1 | 8/2009 | Hunsinger | |
| 2009/0266081 | A1 * | 10/2009 | Graham | 60/780 |
| 2013/0309157 | A1 * | 11/2013 | Sjostrom et al. | 423/242.1 |

FOREIGN PATENT DOCUMENTS

| | | | |
|---|---|---|---|
| DE | 1915852 | A1 | 10/1970 |
| DE | 4007166 | A1 | 9/1991 |
| DE | 4300192 | A1 | 7/1994 |
| DE | 4402172 | A1 | 7/2005 |
| DE | 10338752 | B9 | 6/2006 |
| DE | 102005036792 | A1 | 2/2007 |
| DE | 102006005464 | B3 | 7/2007 |
| DE | 102006016963 | B3 | 10/2007 |
| EP | 0593999 | A1 | 4/1994 |
| EP | 0770823 | A2 | 5/1997 |
| EP | 0941777 | A2 | 9/1999 |
| EP | 0851175 | B1 | 4/2002 |
| EP | 1479455 | A2 | 11/2004 |
| EP | 0823590 | B1 | 2/2005 |
| EP | 1726876 | A1 | 11/2006 |
| EP | 1901003 | A1 | 3/2008 |
| WO | WO 9958902 | A1 | 11/1999 |

OTHER PUBLICATIONS

R. E. Hester and R. M. Harrison, "Waste Invineration and the Environment," 1994, The Royal Academy of Chemistry. see pp. 72 and 82.*

Rubel, Aurora M, "Forms of Ammonia on SCR, SNCR, and FGC Combustion Ashes," printed in Fuel Division Preprints 2002, 47(2), pp. 834-835.*

Fire, Frank L, "The Common Sense Approach to Hazardous Materials," 1996 by PennWell Corporation, see p. 274.*

Richards, John R. "Contorl of Gaseous Emissions" studen manual, US Environmental Protection Agency Air Pollution Training Institute, Jan. 2000. See pages: cover, 1-1, 1-5, 2-6, 2-8, 5-1, 5-21, 5-45 and 5-46.*

* cited by examiner

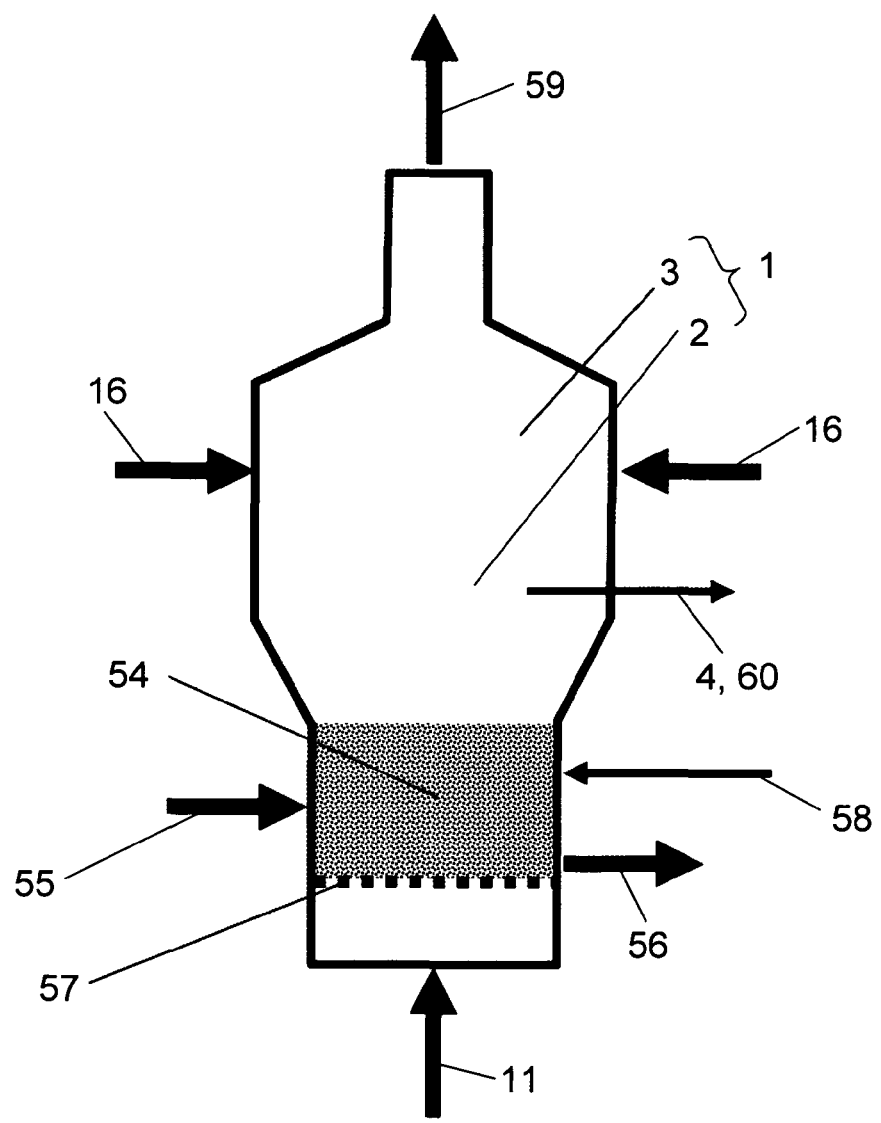

US 9,134,022 B2

METHOD AND DEVICE FOR REDUCING HAZARDOUS EMISSIONS IN INTERNAL COMBUSTION SYSTEMS

CROSS REFERENCE TO RELATED APPLICATIONS

This application is a U.S. National Phase application under 35 U.S.C. §371 of International Application No. PCT/EP2009/007690, filed on Oct. 28, 2009, and claims benefit to German Patent Application No. DE 10 2008 054 038.2, filed on Oct. 30, 2008. The International Application was published in German on May 6, 2010 as WO 2010/049127 A1 under PCT Article 21 (2).

FIELD

The present invention relates to a method and a device for reducing pollutant emissions in combustion systems having a primary combustion chamber and a secondary combustion chamber.

BACKGROUND

Whenever sulfur-, nitrogen- and chlorine-containing fuels, for example, are burned during combustion processes, sulfur oxides, nitrogen oxides and hydrochloric acid, as well as chlorinated organic compounds, such as polychlorinated dibenzo-p-dioxins and dibenzofurans (PCDD/Fs), are released. Due to their toxicity, all these pollutants are often subject to national emission limits. In the Federal Republic of Germany, for example, emission limits have been laid down by the legislator in the 17th Ordinance Implementing the Federal Immission Control Act (17th BImSchV) for waste incineration plants.

In industrial combustion systems, solid fuels are usually burned in two stages. In a first step, the solid fuel is burned by adding an oxygen-containing primary gas (primary air). The oxygen-containing primary gas (primary air) is typically supplied in substoichiometric amounts. Because of the resulting incomplete burnout of the primarily formed flue gases, which is attributable to a local lack of oxygen in the combustion bed, oxygen-containing secondary gas (secondary air) has to be introduced into and mixed with the primarily formed hot flue gas, which still has a high heating value, in a superstoichiometric ratio, as a result of which a post-combustion process is initiated.

Solid fuels, such as household waste and biomass, but also coal, are often burned in grate-, fluidized-bed-, or also rotary kiln combustion systems. Household waste and biomass, in particular, are often highly inhomogeneous in terms of heating value, ash content, moisture content, material composition and/or particle size.

In grate combustion systems, the solid fuel is transported on a combustion grate subdivided into several zones, and is burned out while primary air is supplied to the individual grate zones in a controlled manner. In most cases, this done without subjecting the solid fuel to complex preprocessing. In an idealized consideration, the burning of solid fuels can be broken down into the sequential subprocesses of drying, degassing and combustion of the fixed carbon. Due to the typically poor mixing of the often inhomogeneous solid fuels or fuel mixtures in the fuel bed, these subprocesses may overlap during transport on combustion grates. Drying occurs mainly in the front grate area, and is caused by intensive heat radiation from the hot combustion gases from the primary combustion chamber and/or from the hot combustion chamber walls/ceiling and/or by supplying preheated primary air. During drying, the oxygen supplied with the primary air is not consumed. Further temperature increase during the subsequent degassing of the fuel causes large amounts of volatile hydrocarbons to be released from the fuel bed. This is the grate area where the highest local carbon conversion occurs. Depending on the local temperatures and the $O_2$ concentration in the fuel bed, the released hydrocarbons are ignited and completely or partially burned. When oxygen is supplied in (locally) substoichiometric amounts, considerable amounts of unburned hydrocarbons remain in the exhaust gas after the oxygen present in the primary combustion zone is fully consumed. These unburned hydrocarbons are partially converted to CO, $H_2$ and soot by gasification reactions at high temperatures. These primarily formed flue gases in the primary combustion zone have a high heating value.

In parallel to the degassing process, volatile nitrogen-containing compounds (N species), mainly $NH_3$ (ammonia) and, to a lesser extent, HCN (hydrocyanic acid) and nitrogen-containing hydrocarbons are formed from the fuel nitrogen. These primary N species are completely or partially oxidized to NO, depending on the local $O_2$ concentrations and temperatures in the combustion bed. When there is a lack of oxygen (in the main combustion zone), considerable amounts of volatile nitrogen compounds, in particular $NH_3$, remain in the high heating-value flue gas exiting the combustion bed.

The thermally unstable sulfur-containing compounds of the fuel are mainly released as hydrogen sulfide ($H_2S$) when there is a lack of oxygen in the area of the primary combustion zone.

During combustion of the solids, the chlorine-containing compounds of the fuel (e.g., PVC and from inorganic chlorides, such as NaCl) are mainly converted to hydrochloric acid. A smaller fraction is released into the flue gas as volatile inorganic chlorides (e.g., alkali chlorides, heavy metal chlorides) or also organic chlorine compounds (e.g., chlorobenzenes).

In the rear grate area, the fixed carbon remaining after the degassing process is burned while primary air is supplied in locally superstoichiometric amounts. Since the primary air is typically supplied in considerable excess in this area of the grate, the combustion bed temperature decreases, as a result of which the kinetics of the conversion of residual carbon is relatively slow. Rising temperatures in the slag bed at the end of the grate accelerate the combustion of carbon when oxygen is present in sufficient amounts, thus ensuring low residual carbon contents (TOC) in the discharged slag.

The nitrogen content of the residual coke formed upon degassing is relatively low. Combustion with an excess of $O_2$ mainly produces NO (nitric oxide). The volume and distribution of primary air, and the grate kinematics, have a significant influence on the progress of combustion of the fuel bed as it transported along the grate, thus influencing the axial distribution of temperatures, $O_2$ concentrations, flue gas heating values, and the $NH_3/NO$ ratio in the flue gas streams released from the individual combustion bed zones.

The flue gases formed primarily during combustion of the solids, in particular the oxygen-free, high heating-value flue gases from the primary combustion zone ($O_2$ minimum) must be burned as completely as possible at high temperatures in a second combustion step by addition of and mixing with superstoichiometric amounts of oxygen-containing secondary gas (secondary air).

In the area of this flue gas burnout zone, complex reactions ultimately result in nitrogen oxides ($NO_x$, mainly nitric oxide NO) and/or nitrous oxide ($N_2O$) and/or nitrogen ($N_2$) being formed from the N species primarily formed during combustion of the solids. The heating value and the $NH_3/NO$ ratio of the flue gases before entering the primary flue gas burnout zone, and the local distribution of temperatures and oxygen concentrations during flue gas burnout, exert a decisive influence on the resulting final distribution of N species in the flue gas downstream of the flue gas burnout zone. Under ideal conditions, $NH_3$ and NO react to produce $N_2$ during flue gas burnout as a result of an autogenous SNCR process.

In grate combustion systems for household waste incineration, the stoichiometry of the primary air supplied (the sum of all primary air streams) is typically in the range from 0.6 to 1.2. In waste incineration plants, the secondary air is controlled in such a way that the combustion temperatures in the flue gas after addition of secondary gas is maintained above 850° C. for a residence time of two seconds. The oxygen content in the spent flue gas is typically in the range from about 5 to 12 percent by volume. The energy released during combustion is typically used to generate steam in a boiler. The often relatively high excess of air and the typically relatively high temperatures in the flue gas downstream of the boiler (180-250° C.; i.e., above the acid dew point) cause a considerable loss of energy during the recovery of the thermal energy contained in the flue gas in a boiler. The boiler efficiency (the ratio of the energy content of the generated steam to the energy input of the fuel) is in the range of 80-85% in waste combustion and about 93% in coal combustion.

There are various well-known approaches for reducing pollutant emissions in combustion processes. These approaches not only include downstream flue gas cleaning measures, but also primary measures for reducing the pollutant formation rates.

German Patent DE 103 38 752 B9, for example, describes a method for reducing polyhalogenated compounds, such as PCDD/Fs, in incineration plants having at least one combustion chamber. In this approach, $SO_2$ is selectively separated from the flue gas in at least one scrubber and is recycled into the combustion chamber. The sulfation of the chloride-containing fly ash caused by increasing the $SO_2$ concentration (in the flue gas downstream of the flue gas burnout zone) significantly reduces PCDD/F formation. In addition, sulfated fly ash having a low chloride concentration cause considerably less corrosion problems for the boiler materials.

Further, German Patent DE 10 2006 016 963 B3 describes a method, in which sulfur dioxide $SO_2$ is selectively separated from the flue gas in at least one scrubber by means of ammonia or ammonia compounds, thereby forming an aqueous ammonium sulfate/sulfite solution, which is recycled entirely or partly into the combustion chamber, and which during thermal decomposition also increases the $SO_2$ concentration.

Furthermore, German Patent DE 10 2006 005 464 B3 describes a method for reducing $NO_x$ on the primary side thorough axial mixing of all flue gas streams emanating from the fuel bed in a grate combustion system prior to entry into the flue gas burnout zone, and simultaneous control of the temperature by means of a controlled gas/water free jet.

Moreover, various approaches have been proposed in the literature to increase energy efficiency by combining several different combustion processes.

German Patent Application DE 10 2005 036 792 A1, for example, describes a system wherein combustion takes place in two separate plants, but the flue gases are at least in part cleaned together. In this approach, a first combustion plant (for waste, biomass or other substitute fuels) and a second combustion plant, which is fired with fossil fuels (such as hard coal, lignite, natural gas, oil), are coupled together on the steam side. Chlorine-containing fuels, in particular, produce highly corrosive flue gases during combustion. In order to limit corrosion in the boiler, saturated or slightly superheated steam at relatively low temperature levels is generated in the waste combustion plant. The relatively energy primary steam is then further superheated in the second, fossil-fired combustion plant so as to increase the efficiency in steam-powered generation of electricity. However, the disclosed concept is very complex and requires two different fuel streams to be simultaneously supplied to two separate combustion plants.

German Patent DE 43 00 192 C2 proposes to combine two waste heat processes for generating superheated high energy steam. The first process may be a waste combustion process and is used to generate saturated steam. In the second process, the saturated steam is superheated in a boiler, which may be heated by the exhaust of a gas turbine, for example. This concept also requires two different fuel streams.

European Patent EP 0 593 999 B1 and German Patent DE 19 15 852 C3 also describe methods for power generation in waste or hazardous waste incineration plants. Saturated steam is generated by the combustion of waste and is superheated in a second boiler using regular fuel, such as natural gas (EP 0 593 999 B1) or oil or coal (DE 19 15 852 C3); i.e., also by means of a second, fossil fuel.

In contrast, European Patent EP 0 823 590 B1 describes a method for generating steam having a temperature of 200-320° C., which method uses a chlorine-containing energy source (e.g., waste) and, unlike the aforementioned prior art, uses only one fuel. Shredded waste is heated in a fluidized-bed pyrolysis plant while air is introduced at a low rate. In a first combustion process, the chlorine-containing pyrolysis gases released during the pyrolysis of the waste are burned, and steam having a temperature below 400° C. is generated. During combustion, the nitrogen compounds contained in the pyrolysis gas form significant amounts of nitrogen oxides and must be separated using complex flue gas cleaning techniques. The coke-containing pyrolysis residue is subsequently mechanically processed (screened to remove coarse fractions), and after removing impurities, it should be substantially free of chlorine. In a second stage, this residual coke (fixed carbon) from the pyrolysis of waste is burned, thereby further superheating the steam to up to 520° C. However, pyrolysis cokes from waste materials typically still contain considerable amounts of alkali and/or metal compounds, in particular chlorides, which are released into the exhaust gas during combustion, and which may deposit on the heat-exchange surfaces of the steam superheater. This causes the well-known corrosion effects in the boiler.

SUMMARY

In an embodiment, the present invention provides a method for reducing pollutant emissions in a combustion system using a two-stage primary combustion process for a solid containing fuel. The system includes a primary furnace having a primary combustion chamber, a solid fuel burnout zone and a primary flue-gas post combustion chamber, and a separate secondary combustion train. The method includes burning the fuel in a primary combustion chamber while supplying primary gas in a substoichiometric amount so as to form a high heating-value combustion gas and a low-carbon solid residue. A partial stream of the formed high heating-value combustion gas is diverted and a remainder of the combustion gas is passed to the primary flue gas post-combustion chamber. The diverted partial stream is passed to the secondary combustion train, which includes a combustion gas conditioner, a secondary combustion gas combustion chamber and an energy recovery device. The passing of the diverted partial stream to the secondary combustion train is performed so as to reduce, in the combustion gas conditioner, a temperature of the diverted partial stream in a temperature control device including at least one of a heat exchanger and a quench; clean, in the combustion gas conditioner, the diverted partial stream by removing at least one of ash, soot particles and corrosive gas components; and then burn the diverted partial stream in the secondary combustion gas combustion chamber while supplying oxygen-containing gas so as to produce hot, low-corrosive exhaust gases; and then recover, in the energy recovery device, energy from the low-corrosive exhaust gases so as to produce burned-out energy-spent exhaust gas. The energy-spent exhaust gas is recirculated to the primary furnace upstream of the primary flue gas post-combustion chamber and is burned in the primary flue gas post-combustion chamber with the remainder of the high heating value combustion gas stream while adding an oxygen-containing secondary gas in superstoichiometric amounts so as to produce a primary exhaust gas. The primary exhaust gas is fed to a primary steam generator and a primary flue gas cleaning unit.

BRIEF DESCRIPTION OF THE DRAWINGS

Exemplary embodiments of the present invention are described in more detail below with reference to the drawings, in which:

FIG. 8 is a schematic view of a primary combustion chamber having a combustion gas branch passage in a stationary fluidized-bed combustion system.

DETAILED DESCRIPTION

Figure 1:
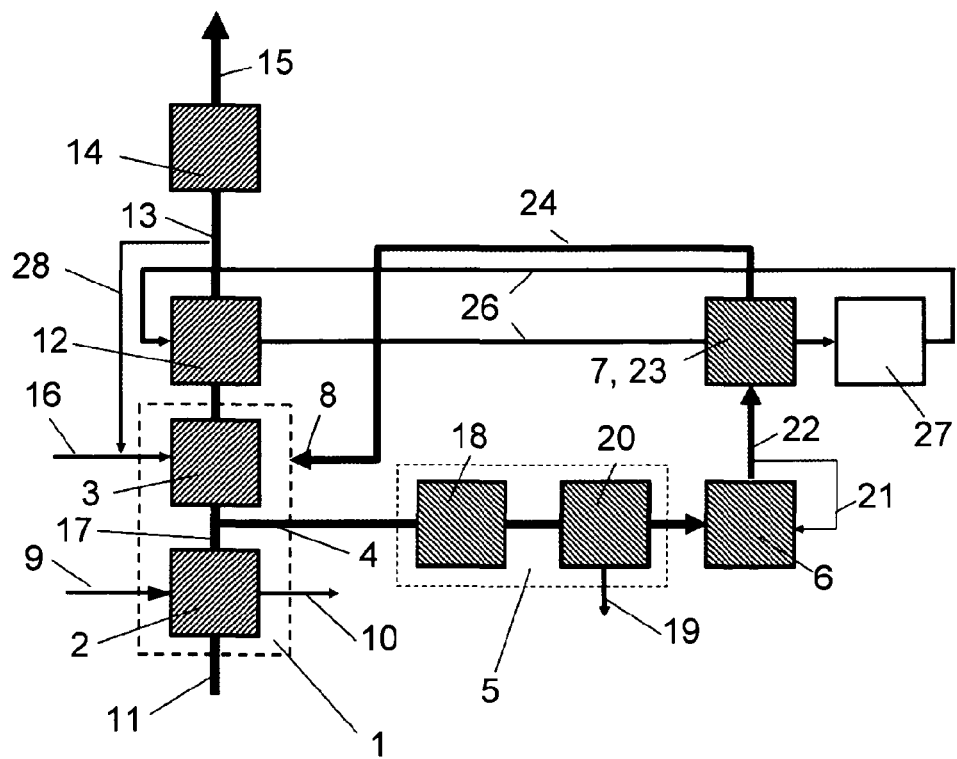
FIG. 1 is a schematic view of a combustion system for solid fuels, including a two-stage primary combustion process and a separate secondary combustion.

An aspect of the present invention is to provide a method and a device for reducing the formation and emission of pollutants in combustion systems for solid fuels and/or solid fuel mixtures, using a two-stage primary combustion process, which method and device in particular enable substantially the entire energy content of the fuels to be used with high efficiency for generating electric power, while in principle requiring only one stream of solid fuel to be introduced.

In an embodiment, the present invention provides a method and a device for reducing pollutant emissions in combustion systems for preferably solid fuels, using a two-stage primary combustion process. The primary combustion takes place in a solid fuel burnout zone, a primary combustion chamber and a primary flue gas post-combustion chamber. During primary combustion, the solid fuel is burned out while primary gas is supplied in substoichiometric amounts (lack of oxygen), resulting in the formation of a high heating-value combustion gas and a low-carbon solid residue.

The system also includes a separate secondary combustion, in which part of the high heating-value combustion gases primarily formed during combustion of the solids are burned in a secondary combustion train. This partial combustion gas stream is diverted through a branch passage, preferably a combustion gas withdrawal means, from the solid fuel burnout zone or the region downstream of the solid fuel burnout zone and upstream of the entry to the primary flue gas post-combustion chamber, while the remainder of the combustion gas stream, once it has passed through the primary combustion chamber and the spent exhaust gas from the secondary furnace has been added and mixed therewith, is burned out in the primary flue gas post-combustion chamber while oxygen-containing secondary gas is supplied in superstoichiometric amounts, and is then fed to a primary steam generator and a primary flue gas cleaning unit.

Thus, it is a feature of the method and device that the combustion gas stream is split into two trains downstream of the first fixed-bed combustion stage. The diverted high heating-value partial combustion gas stream is conditioned (i.e., cooled and cleaned) and burned out in the secondary combustion chamber, and the released energy is used to increase the steam enthalpy in a secondary steam superheater connected in series with the primary steam generator. As an alternative to secondary superheating of the steam, and within the scope of the present invention, energy recovery may also be accomplished using a gas turbine or gas engine or Sterling engine. Spent exhaust gas from the secondary combustion is recirculated to the primary furnace at a point upstream of the primary flue gas burnout zone so as to be jointly burned out and subjected to a common (residual) heat recovery process in the primary steam generator and be conveyed to a primary flue gas cleaning unit.

In an embodiment of the present invention, the post-combusted flue gas from the secondary combustion train is introduced upstream of the primary post-combustion chamber. Through selective introduction of spent flue gas from the secondary combustion at a point upstream of the aforesaid primary post-combustion chamber, it is particularly advantageously possible to control the composition of the combustion gas, and thus, the composition of the emissions during primary post-combustion in the aforementioned primary post-combustion chamber. Particularly advantageously, this makes it possible to influence the formation of emissions (in particular, PCDD/F and/or $NO_x$ levels), and to reduce the complexity of a subsequent primary flue gas cleaning process. The quality of the solid residues (slag and fly ash in the primary combustion process) is not negatively affected by these measures.

In this manner, it is also possible to reduce the content of corrosion-promoting components in the flue gas, and thus the potential for boiler corrosion in the primary steam generator. In this connection, the composition of the introduced flue gas is preferably controlled by the conditioning of the combustion gas in the secondary combustion unit (removal of chlorides and HCl).

In the secondary combustion train, downstream of the branch point, the diverted combustion gases (i.e., the aforementioned partial stream of combustion gases) are subjected to conditioning. This conditioning process includes controlling the temperature of the diverted combustion gases to preferably between 350 and 500° C., more preferably to between 400 and 450° C., and even more preferably to between 400 and 425° C. These temperature windows are below the condensation temperatures and/or solidus temperatures of most of the volatile alkali and heavy metal compounds present in the flue gases, which are then sublimated to the solid state during cooling, forming a solid aerosol, or condensed on ash and soot particles and are filtered out or otherwise removed along with these particles. These temperatures are still sufficiently high to prevent condensation of heavy hydrocarbons (tar).

Fuel conditioning not only includes the aforementioned temperature control means (including, for example, a heat exchanger or water quench), but also combustion gas cleaning means, preferably downstream of the temperature control means. The cleaning of the combustion gas is not only performed for the above-mentioned removal of the alkali and heavy metal compounds, in particular alkali and heavy metal chlorides, together with ash and soot particles from the combustion gas, but also to remove corrosive gaseous components of the combustion gas, such as acid components (e.g., HCl).

Removal of the acid components, such as HCl, is preferably accomplished by introducing metered amounts of a sorbent, such as CaO (calcium oxide), CaOH (calcium hydroxide), and/or $CaCO_3$ (calcium carbonate), into the combustion gas. The sorbent, which is introduced as a solid, aqueous solution or suspension, is used to absorb the acid components. The solid reaction product formed is filtered out from the combustion gas upstream of the secondary combustion chamber.

Downstream of the separation stage, the conditioned combustion gas is not only free of suspended solids, but is also substantially free of hydrochloric acid, chlorides and alkali compounds. Thus, the conditioned combustion gas particularly advantageously enables conventional post-combustion (secondary combustion) with particularly low emission levels in a secondary combustion gas combustion chamber, preferably while an oxygen-containing gas (secondary gas) is supplied in superstoichiometric amounts. This secondary combustion produces hot and low-corrosive exhaust gases. The exhaust gas formed during the combustion of the cleaned combustion gas is substantially unproblematic with respect to boiler corrosion for the lack of corrosion-promoting components. Therefore, the hot, low-corrosive exhaust gas is particularly suitable for energy recovery, preferably by heat transfer through, for example, metal heat exchangers even at elevated temperatures of above 400° C. of the boiler material, for example, in order to superheat the steam from the above-mentioned primary steam generator to very high temperatures. Thus, electric power can be generated with very high efficiency using, for example, a steam turbine analogously to a typical, fossil-fired power plant.

One particular advantage resides in the fact that the entire solid fuel stream is supplied only to the primary combustion process; i.e., into the solid fuel burnout zone. Consequently, the method and the device for carrying out the method are designed such that the solid fuel is strictly based on a single stream of solid fuel (mono-combustion) with a solid fuel burnout zone.

Another feature of the method and device is that, as a general principle, it is possible to control the ratio of the volumetric flow rates of the partial combustion gas stream to the secondary furnace and the remaining combustion gas stream. Thus, the energy flow rates in the primary and secondary furnaces can not only be separately matched for combined recovery of thermal energy (e.g., primary steam generator and downstream final superheating of the steam in the secondary combustion unit), but can also be used for an overall low-emission combustion.

In particular, embodiments of the present invention enable mono-combustion of low-quality solid fuel, such as household waste, without having to pre-process the fuel in a special way or select specific fractions of solid fuel (e.g., waste fractions); the combustion and the formation of pollutants being controllable not only by controlled splitting of the combustion gases from the primary furnace into the existing (one or more) post-combustion trains, but also by conditioning the combustion gas as described above prior to post-combustion in the secondary furnace, thereby allowing the influences of possible fuel inhomogeneities to be compensated for. In accordance with the present invention, household waste combustion is possible not only with an electric power generation efficiency comparable to that of a power plant without additional use of fossil fuels, but also with low pollutant formation rates (in particular, $NO_x$ and PCDD/F) and low corrosion potential for the boiler materials at elevated temperatures, in particular above 400° C. Another feature is that the solid residues produced (slag, fly ash) continue to be of high quality (residual carbon TOC<1%).

Embodiments of the present invention also include a method wherein the ratio of the hydrogen halide to the $SO_2$ concentration in the flue gas downstream of the flue gas burnout zone of the primary furnace is controlled by admixing the partial stream of spent exhaust gas, which is substantially free of hydrogen halide but contains $SO_2$, thereby improving the sulfation of fly ashes in the primary furnace. This reduces the corrosion potential of fly ash deposits on the surface of the primary steam generator while at the same time inhibiting the formation of dioxins in the primary steam generator. In the combustion gas conditioner of the secondary furnace, preferably all combustion gas components that counteract the aforementioned sulfation, and in particular hydrogen halides, are removed. Accordingly, in a preferred embodiment of the method, it is ensured that hydrogen halides are completely or substantially removed during the conditioning of the combustion gas. Preferably, hydrogen sulfide $H_2S$ or other sulfur-containing gaseous substances are not removed in this process. $H_2S$ is burned to $SO_2$ during the combustion of the combustion gas in the secondary furnace and is fed to the primary furnace in the exhaust gas.

Exemplary Embodiment 1

FIG. 1 shows, in a schematic view, a solid fuel combustion system including a primary furnace 1, which is designed for combustion of solid fuel and includes a primary combustion chamber 2 (including a solid fuel burnout zone) and a primary flue gas post-combustion chamber 3, and further including a second secondary combustion train having a branch passage 4, a combustion gas conditioner 5, a secondary combustion gas combustion chamber 6, energy recovery means 7, as well as an outlet 8 into the primary furnace, preferably upstream of primary flue gas post-combustion chamber 3. As a general principle, the primary furnace is in the form of a grate, fluidized-bed or rotary kiln furnace.

Primary combustion chamber 2 has a solid fuel inlet port 9, a slag discharge port 10, and a primary gas inlet 11. A solid fuel, such as waste and/or biomass and/or coal, is supplied to the primary furnace through fuel inlet port 9. In the first stage of the primary furnace, the solid fuel is burned in primary combustion chamber 2 while oxygen-containing primary gas, such as air, is supplied (primary gas inlet 11). When oxygen is supplied in (locally) substoichiometric amounts (lack of oxygen) by the oxygen-containing primary gas, high heating-value flue gases are formed and released as combustion gases from the combustion bed (solid fuel burnout zone). Subsequently, a portion of these high heating-value combustion gases passes on into primary flue gas post-combustion chamber 3, where they are burned out at high temperatures along with the exhaust gas from the secondary furnace while oxygen-containing secondary gas (excess air) is supplied in superstoichiometric amounts. The hot flue gas produced in the process is fed to a primary steam generator 12 (primary boiler). In the primary steam generator, the thermal energy of the hot flue gas is used to generate steam, in which process the flue gas cools down. Depending on the type of fuel used (composition, homogeneity, moisture content, N, Cl, S, etc.), different pollutants are formed and/or released from the combustion bed during combustion. In order to meet the legal requirements on emissions from combustion systems, the cooled flue gas (preferably to T<200° C.) is fed as raw gas 13 to primary flue gas cleaning stages 14 downstream of the boiler, and exits said primary flue gas cleaning stages as clean gas 15. The flue gas cleaning unit located downstream of the boiler includes one or more stages for removal of dust and/or HCl and/or HF and/or $SO_2$ and/or Hg and/or $NO_x$ and/or PCDD/Fs. In the case low-emission combustion processes, $NO_x$ and/or PCDD/F removal processes may be omitted.

In this exemplary embodiment, primary steam generator 12 preferably includes the stages ECO, evaporator and superheater, all of which are heated together by the flue gas stream from post-combustion chamber 3. In this process, steam, preferably superheated steam, having maximum temperatures of 400° C. is generated for the purpose of recovering energy from the flue gas from the primary post-combustion chamber. In the case of chloride-containing ash deposits, in particular, higher steam temperatures result in severe corrosion of the boiler material (chlorine-induced boiler corrosion) and, therefore, cause significant costs (repair, downtime).

An important feature of the device includes the above-mentioned second secondary combustion train though which a portion of the high heating-value combustion gas is diverted prior to entry into the primary post-combustion chamber. This portion of the combustion gas stream is taken from the combustion gas stream from the primary furnace, preferably in the region between the surface of the fixed combustion bed in primary combustion chamber 2 and inlet 16 for the oxygen-containing secondary gas in primary flue gas post-combustion chamber 3. Due to the substoichiometric combustion of the solid fuel, the high heating-value combustion gas diverted from primary combustion chamber 2 is free, or substantially free of oxygen, and its main constituents are the gases $N_2$, $H_2O$, $CO_2$, CO, $C_nH_m$, $H_2$. However, it also contains solid combustion products, such as fly ash, soot particles, and volatile alkali and (heavy) metal compounds (mostly chlorides) and Hg, HCl, HF, $H_2S$, $NH_3$, as well as small amounts of NO.

The portion of high heating-value combustion gas diverted from combustion gas stream 17 is first fed to combustion gas conditioner 5, in which partial combustion gas stream is first cooled in a heat exchanger 18 (or quench) to temperatures of preferably between 350 and 450° C. In the process, substantially all of the volatile alkali and metal compounds sublimate or condense on the surface of the fly ash, except for mercury. The fly ash particles and the soot particles can then be removed, preferably by filtration 20, from the combustion gas along with other solids as discharged solid material 19 and either be returned to a combustion process, for example, in primary combustion chamber 2, or be otherwise processed, recycled or landfilled.

By introducing an alkali- or alkaline-earth-containing neutralizing agent, such as calcium oxide CaO and/or calcium carbonate $CaCO_3$ and/or calcium hydroxide $Ca(OH)_2$ in metered amounts, preferably into the combustion gas stream subsequent to temperature control and prior to filtration 20, it is also possible to absorb corrosive acidic gases, such as hydrochloric acid HCl or hydrofluoric acid HF, and to remove them along with the above-mentioned solids in the filter for suspended particles. The solids arising during filtration of the combustion gas are mainly composed of fly ash having a very high carbon content (soot particles, contaminated with polyaromatic hydrocarbons (PAH)) and of the reaction product ($CaCl_2$, $CaF_2$). These residues are removed and further processed, preferably burned or landfilled. However, Hg and $NH_3$ are virtually not removed by this filtration.

Alternatively, it would be possible to provide a separate fixed-bed absorber (e.g., a packed bed of absorbing particles) for absorbing acidic gases (in particular HCl).

The high-carbon fly ashes/solids removed contain very high concentrations of toxic polyaromatic hydrocarbons (PAH), such as, in particular, naphthalene, phenanthrene, anthracene, fluoranthene, pyrene, chrysene and other toxic compounds. These ashes may be burned in the primary combustion unit or separately outside of the system shown in FIG. 1, during which process the carbon particles and the PAH are oxidized to $CO_2$ and $H_2O$. At the usual, high combustion temperatures above 800° C., it is likely that inorganic chloride-containing compounds are evaporated and thermally decomposed, and thus, that hydrochloric acid HCl is released (e.g., $CaCl_2$ releases hydrochloric acid HCl):

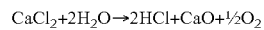

$$CaCl_2 + 2H_2O \rightarrow 2HCl + CaO + \tfrac{1}{2}O_2$$

The chloride- and/or HCl-containing exhaust gas produced during separate combustion of ash is then preferably introduced into the cooled raw gas 13 downstream of primary steam generator 12 and upstream of primary flue gas cleaning stages 14, and cleaned in the primary flue gas cleaning unit of the primary combustion unit; i.e., in primary flue gas cleaning stages 14. The remaining burned-out low-carbon ash residue may be utilized or landfilled along with the fly ash removed by the primary flue gas cleaning unit.

The conditioned (cleaned) high heating-value partial combustion gas stream is burned out in secondary combustion gas combustion chamber 6 using, for example, an air-staged low-$NO_x$ gas burner, while an oxygen-containing gas (secondary gas) is supplied. The burning of said partial combustion gas stream preferably occurs in the presence of excess oxygen. The combustion air and/or the oxygen-containing secondary gas needed for this purpose is/are preferably preheated in heat exchanger 18. Furthermore, the embodiment shown has a flue gas recirculation loop 21 for recycling a portion of flue gas stream 22 back into secondary combustion gas combustion chamber 6 to control the temperature during the burning out of the combustion gas during secondary combustion (in secondary combustion gas combustion chamber 6).

Alternatively, or in combination, it is possible to recycle flue gas from flue gas stream 24. This makes it possible to achieve a low $NO_x$ formation rate during secondary combustion of the $NH_3$-containing combustion gas at very low excess air levels.

The hydrogen sulfide ($H_2S$) contained in the partial combustion gas stream is removed to a lesser extent than HCl during the conditioning of the combustion gas. Thus, HCl is preferentially removed. Unremoved $H_2S$ is converted to $SO_2$ during the secondary combustion:

$$2H_2S+3O_2 \rightarrow 2SO_2+2H_2O$$

Hot flue gas stream 22 (exhaust gas) is fed from secondary combustion gas combustion chamber 6 to a downstream secondary steam superheater 23 and is used for final superheating of the steam from primary steam generator 12 of primary furnace 1. Due to the low corrosivity of hot flue gas stream 22, it is possible to superheat the steam to temperatures $T_2$>500°, which are typical of power plants, without the risk of premature corrosion damage occurring in secondary steam superheater 23 provided for energy recovery 7. This particularly advantageously allows electricity to be generated by steam power in a steam turbine 27 with the very high efficiency that is typical of power plants. In principle, secondary steam superheater 23 may be incorporated into secondary combustion chamber 6.

The cooled exhaust gas 24 exiting from secondary steam superheater 23 has a temperature which is higher than that of the steam exiting from the primary steam generator and is preferably above that of the cleaned combustion gas downstream of separation stage 20 (above 400° C., more preferably above 450° C.). Exhaust gas 24 is fed through outlet 8 to primary furnace 1, preferably upstream of primary post-combustion chamber 3. This exhaust gas 24 contains $SO_2$ but virtually no hydrochloric acid HCl. Advantageously therefore, when admixing the exhaust gas, the HCl/$SO_2$ ratio in the flue gas of the primary furnace is reduced, and the sulfation of the fly ash in the flue gas downstream of the primary flue gas burnout zone of the primary furnace. Advantageously, this significantly reduces the potential for chlorine-induced boiler corrosion and the formation of dioxins in the area of primary steam generator 12 (boiler of the primary combustion unit). The above-mentioned removal (separation) of carbon-containing solid particles (e.g., soot particles) from the partial combustion gas stream in combustion gas conditioner 5 also contributes to reducing the formation of dioxins (de-novo synthesis) by reducing the particulate carbon content (soot particles) in the ash deposits in primary steam generator 12 of the primary furnace.

The exhaust gas 24 recycled into primary furnace 1 may contain nitrogen oxides $NO_R$. By introducing exhaust gas 24 upstream of primary post-combustion chamber 3 (upstream of secondary gas inlet 16), any existing $NO_R$ are largely reduced to nitrogen $N_2$ in a reducing atmosphere, for example $$2NO+2CO \rightarrow N_2+2CO_2$$

The reduction of $NO_x$ in the primary furnace of a grate combustion system is particularly efficient when the recirculation 24 is via one or more free jets into primary combustion chamber 2 for axial mixing of within the combustion chamber over the regions of the combustion bed. Admixture of water (gas/water free jet) to reduce the heating value of the combustion gas in primary furnace 1, as described in DE 10 2006 005 464 B3, is not needed because the mixing of non-extracted combustion gas 17 with the spent and thermally used exhaust gas 24 reduces the heating value of the resulting mixed flue gas upstream of primary post-combustion zone 3. This reduces or prevents temperature peaks, and thus, formation of $NO_x$ during flue gas burnout in the primary flue gas burnout zone.

Ideally, the reduction of the $NO_x$ formation during final flue gas burnout in primary flue gas burnout zone 3 preferably occurs in the temperature window between 900 and 1000° C. as a result of an autogenous SNCR process $$4NO+4NH_3+O_2 \rightarrow 4N_2+6H_2O$$

This results in very low $NO_x$ formation levels in the primary furnace, thus eliminating the need for additional secondary $NO_x$ reduction measures (such as SCR and/or SNCR).

Moreover, in particular when solid fuels (9) having a very low nitrogen content (such as untreated wood) are used, the recycled oxygen-containing exhaust gas 24 may also be injected into primary flue gas post-combustion chamber 3 as a complete or partial substitute for secondary gas. Additional recirculation of flue gas through a loop 28 to primary flue gas post-combustion chamber 3 further reduces the introduction of secondary air and leads to low $O_2$ levels in exhaust gas 13. This makes it possible to reduce the amount of exhaust gas 13 and to reduce the exhaust gas losses, and thus, to increase the boiler efficiency.

Moreover, recirculating exhaust gas 24 into primary furnace 1 allows the pollutant fractions remaining therein, which have not been removed during combustion gas conditioning, in particular mercury, to be cleaned along with raw gas 13 in the existing primary flue gas cleaning stages 14 of the primary furnace and without requiring any additional cleaning stages. This does not require any additional cleaning stages.

In FIG. 1, the energy recovery means include a water/steam circuit 26 including the illustrated primary steam generator 12 and secondary steam superheater 23, as well as a steam turbine 27, which is powered by means of said primary steam generator and said secondary steam superheater and drives a generator.

Exemplary Embodiment 2

In a grate combustion system, waste is incinerated on a grate having a plurality of regions over the length of the combustion grate as a fixed-bed burnout zone. The fuel used is, for example, household waste having a very low heating value ($H_u$=7.4 MJ/kg). The stoichiometry of the primary air is $\lambda_p$=0.75. A fuel analysis is shown in Table 1 (referred to the total mass of moist waste).

TABLE 1 fuel composition (fractions are referred to the total mass).

| Constituent | Fraction |
|---|---|
| $H_2O$ | 34.2% |
| volatile constituents | 36.5% |
| fixed carbon | 4.6% |
| ash | 24.7% |
| C | 19.8% |
| H | 3.0% |
| O | 13.0% |
| N | 0.78% |
| Cl | 0.39% |
| S | 0.26% |

In this exemplary embodiment, the portion of high heating-value combustion gas (partial combustion gas stream) to be diverted from the combustion chamber is withdrawn the above combustion grate; i.e., in the area of the primary combustion zone ($O_2$ minimum) of the fixed combustion bed.

Figure 2:
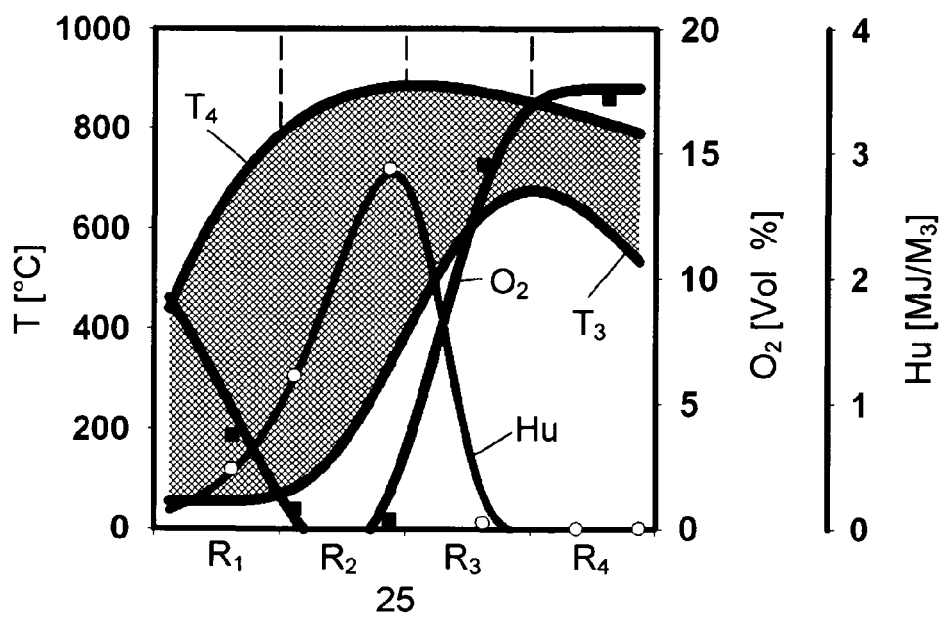
FIG. 2 is a plot of the axial profiles in a grate combustion system of the combustion temperatures T3 of the grate and T4 of the flue gas directly above the fixed combustion bed, of flue gas heating value Hu, and of oxygen content O2 of the flue gas above the combustion bed in the combustion chamber of a grate combustion system over the length of the combustion grate.
Figure 3:
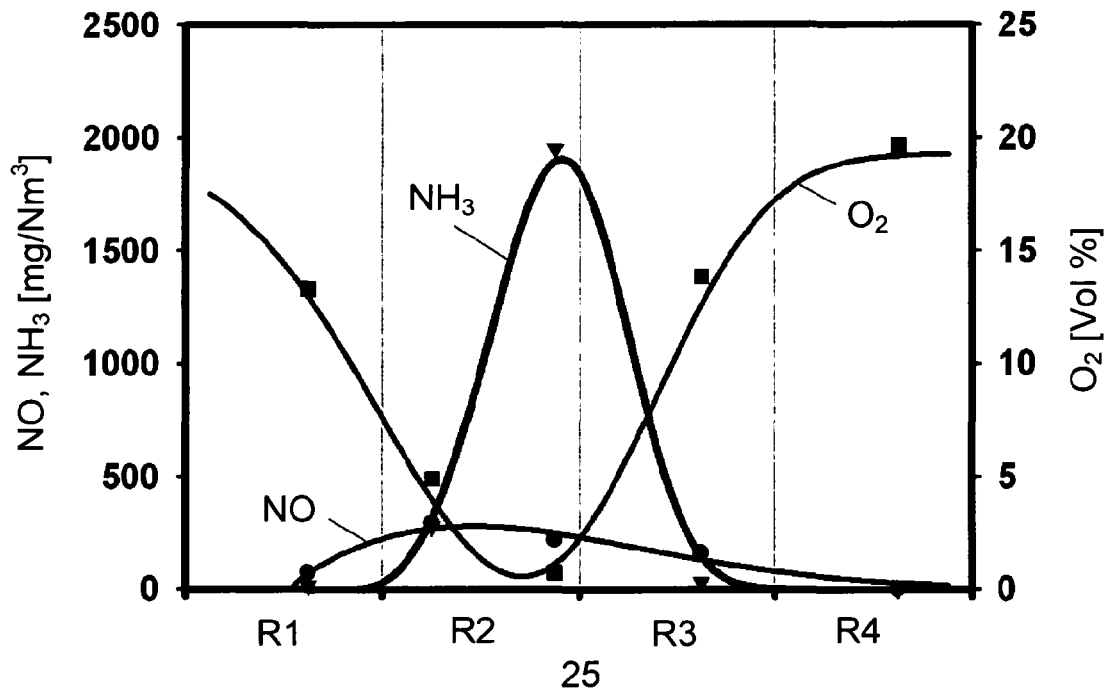
FIG. 3 is a plot of the axial concentration distribution in a grate combustion system of nitric oxide NO, ammonia $NH_3$ and of oxygen $O_2$ in the flue gas above the combustion bed in the combustion chamber over the length of the combustion grate.
Figure 4:
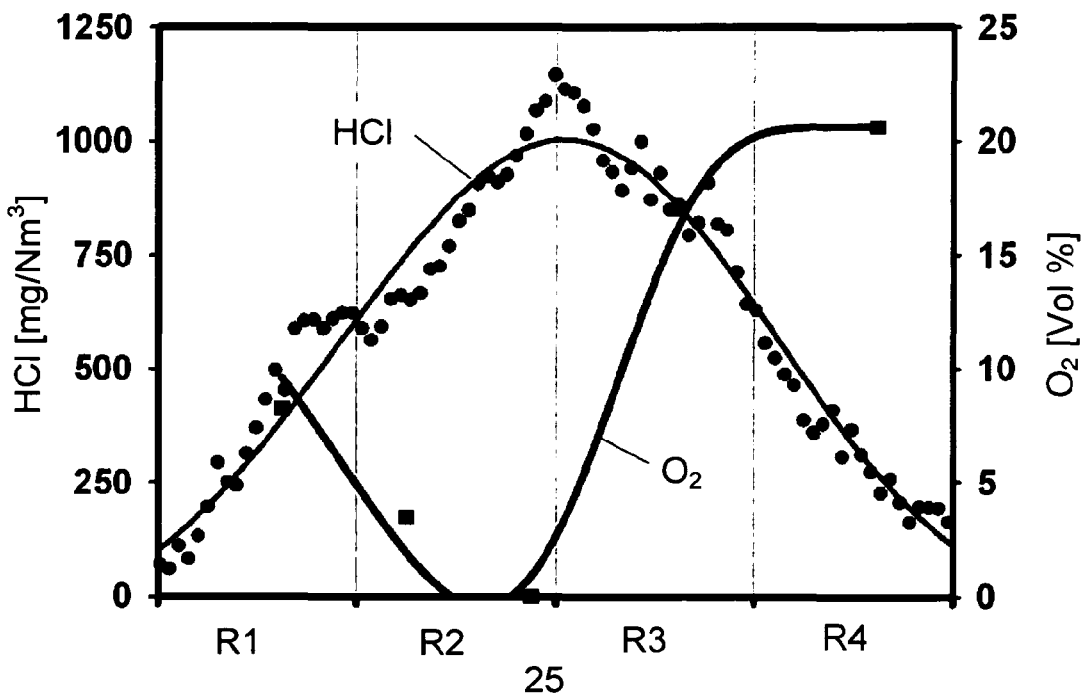
FIG. 4 is a plot of the axial concentration distribution in a grate combustion system of hydrochloric acid and of oxygen $O_2$ in the flue gas above the combustion bed in the combustion chamber over the length of the combustion grate.

FIG. 2 shows the measured axial profiles of the temperatures T3 of the combustion grate and T4 of the combustion gas above fixed combustion bed (both in ° C.), of flue gas heating value $H_u$ (in $MJ/m^3$ of moist mass) in the combustion chamber, and of oxygen content $O_2$ (in percent by volume) in the combustion chamber above the surface of the combustion bed;

FIG. 3 shows the concentrations of nitric oxide NO and ammonia $NH_3$ (in $mg/Nm^3$, where $Nm^3$=standard cubic meter) and oxygen content $O_2$ (in percent by volume); and FIG. 4 shows the concentration of hydrochloric acid (in $mg/Nm^3$) and oxygen content $O_2$ (in percent by volume) in the combustion chamber over combustion grate length 25, including the regions R1 through R4. The fuel passes from the solid fuel inlet port to the slag discharge port across the entire length of the combustion grate from R1 to R4, starting at the left, as illustrated in the diagrams of FIGS. 2 through 4.

The maximum value and the width of the axial distribution (axial sub-region of the grate) of heating value $H_u$ of the combustion gas in the combustion chamber generally increase with increasing heating value $H_u$ and, in particular, with increasing content of volatile constituents and decreasing moisture content of the solid fuel. The amount and the heating value of the combustion gas that can be used for secondary combustion can be increased by reducing the primary air and/or increasing the oxygen content of the primary air and/or pre-heating the primary air, in particular locally in the area of the primary combustion zone ($O_2$ minimum). In FIG. 2, the optimum location for the combustion gas branch point is in the grate area R2/R3. This is where combustion gas temperature T3 increases to a maximum. The subsequent increase in oxygen in grate region R3 in the further course of the process, in conjunction with a decrease in the temperature, is characteristic of thorough burnout of the fixed combustion bed (see FIG. 2).

Therefore, it is preferred to divert combustion gas from the combustion chamber in grate area R2/R3.

The position and extent of the solid fuel combustion on the grate in the primary combustion chamber are preferably influenced and controlled on the basis of combustion characteristics determined by optical combustion monitoring systems, such as by infrared cameras and/or video cameras, and corresponding control of the primary gas supply (amount and distribution to the individual grate regions) and/or of the grate kinematics (rate of advance and residence times of fuel material in the regions of the combustion grate) and/or of the fuel feed rate and/or of the pre-heating of the primary air and/or possibly by oxygen enrichment of the primary gas.

The diversion of combustion gas from the primary combustion chamber to form the partial stream is preferably performed as a function of the heat energy to be delivered by the combustion gas during separate secondary combustion; i.e., based on the calorific value $H_u$ of the fuel multiplied by the volumetric flow rate of the diverted partial combustion gas stream. In order to effect corresponding control actions, first, the calorific value $H_u$ of the combustion gas is determined in the region of extraction or, preferably, in extraction line 4, by means of an on-line gas calorimeter, and is used as a parameter for controlling the mass flow rate of the diverted portion of combustion gas so as to obtain the required heat output from the secondary combustion chamber.

The maximum of the concentration distribution of ammonia $NH_3$ in the combustion chamber (see FIG. 3) is in the region of the $O_2$ minimum. Thus, the diverted portion of the high heating-value combustion gas contains large amounts of ammonia. The burning out of the $NH_3$-containing combustion gas in the secondary combustion chamber can advantageously be accomplished using a commercially available air-staged gas burner (staged low-$NO_x$ burner), which already makes it possible to keep the $NO_x$ formation low.

However, the combustion gas also contains considerable amounts of hydrochloric acid HCl (see FIG. 4), especially in the region of the branch point (R2/R3) ($O_2$ minimum). HCl causes the formation of alkali and metal chlorides in the flue gas, which may deposit on the boiler surface. It is these chloride-containing boiler ash deposits, in particular, that are highly corrosive. Therefore, the HCl formed during combustion of chlorine-containing fuels must be removed in the combustion gas conditioner of the secondary combustion chamber as has been described hereinabove.

In the region of the $O_2$ minimum, sulfur compounds are almost completely released as $H_2S$ into the exhaust gas. During the combustion, $SO_2$ is formed.

$$2H_2S + 3O_2 \rightarrow 2H_2O + 2SO_2$$

Under the conditions prevailing in the secondary furnace/boiler, $SO_2$ causes minimal corrosion problem.

Since HCl is removed preferentially over $H_2S$, and thus more efficiently or more completely, during the conditioning of the combustion gas prior to secondary combustion, the $HCl/SO_2$ ratio upon subsequent recirculation of the spent combustion gas to the primary furnace is also reduced, thereby advantageously also reducing corrosion and PCDD/F formation in the primary steam generator of the primary furnace, and thus in the overall process.

Figure 5A:
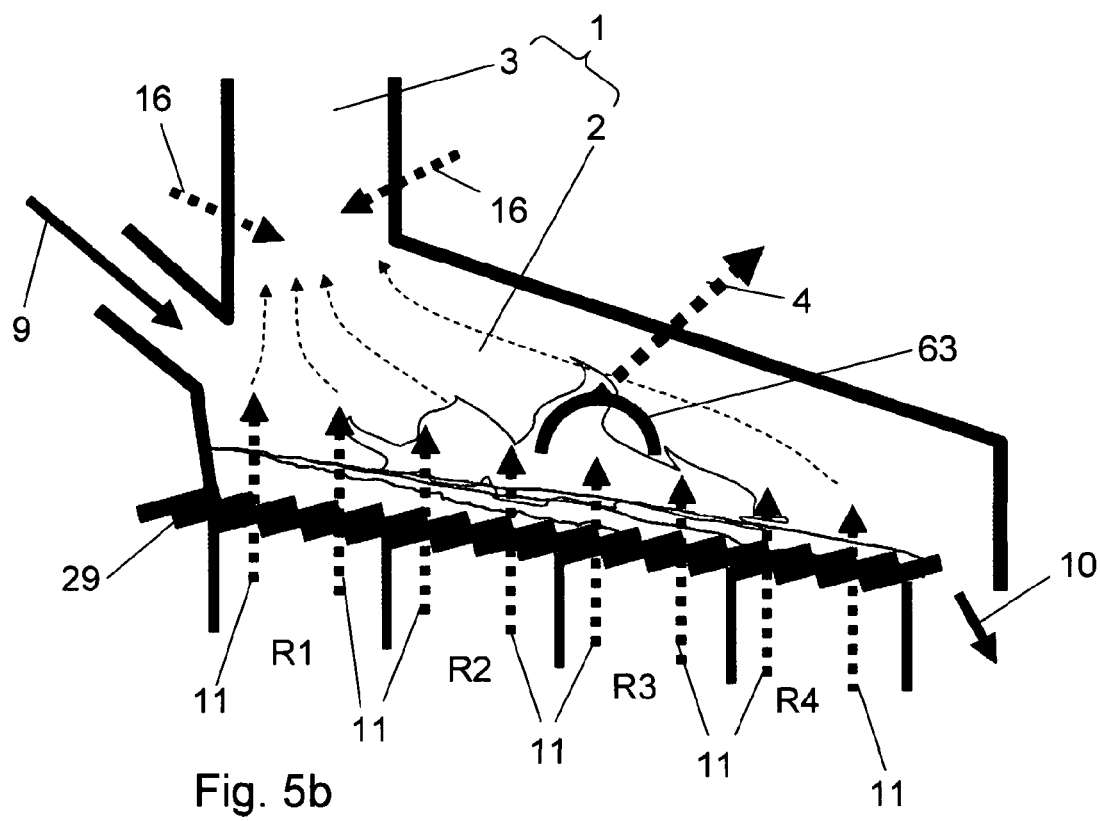
FIGS. 5a through c are views of the primary combustion chamber of a grate combustion system, showing three examples of possible embodiments of a branch passage for a partial combustion gas stream.
Figure 5B:
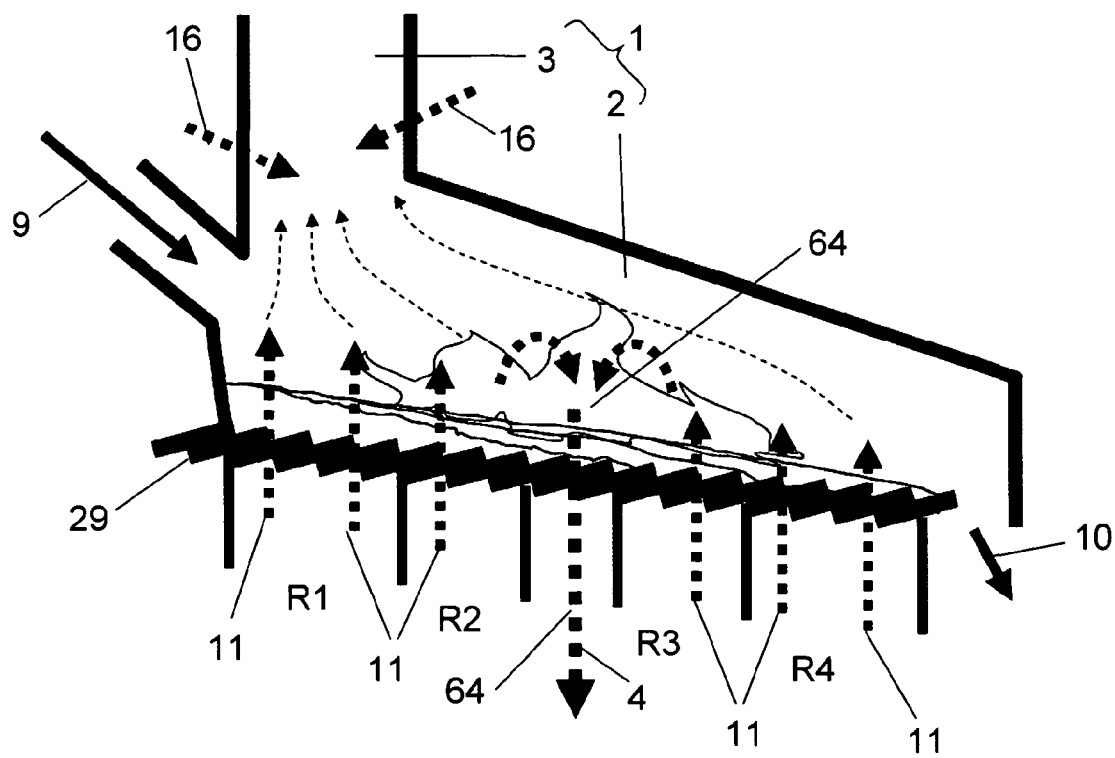
Figure 5C:
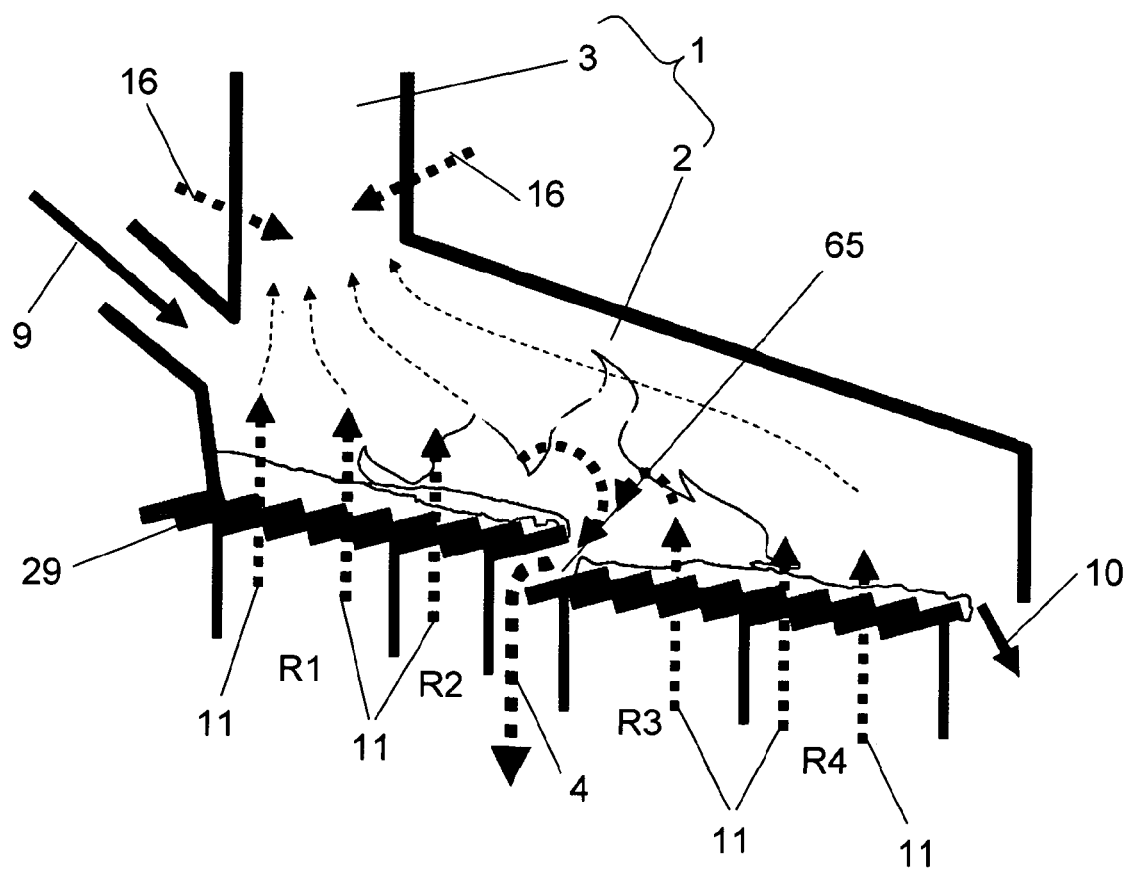

FIGS. 5a through c show examples of how a branch passage 4 for diverting a partial stream of combustion gas may be technically implemented in combustion chamber 2 of a primary furnace 1 above combustion grate 29, taking the above considerations into account. Combustion grate 29 includes four zones R1 through R4 between solid fuel inlet port 9 and slag discharge port 10. Primary air is supplied from below through inlets 11 and passed through the combustion grate. The point where the partial combustion gas stream is diverted is in the area of grate regions R2 and R3.

In FIG. 5a, a partial combustion gas stream is withdrawn through a suction bell 63 which is open at the bottom and forms part of branch passage 4. In the examples shown in FIGS. 5b and c, branch passage 4 is provided by a suction tube 64 for withdrawing the partial combustion gas stream downwardly through combustion grate 29 and the solid fuel bed transported thereon. These embodiments are particularly suitable for incineration of household waste or other loose, porous or otherwise non-compact low heating-value feedstock on a combustion grate. FIG. 5c shows a combustion grate in the form of a stepped grate, which is interrupted between grate regions R2 and R3, forming a gap 65. This reduces the resistance to flow presented by the withdrawal means, thereby further facilitating withdrawal.

Exemplary Embodiment 3

Figure 6A:
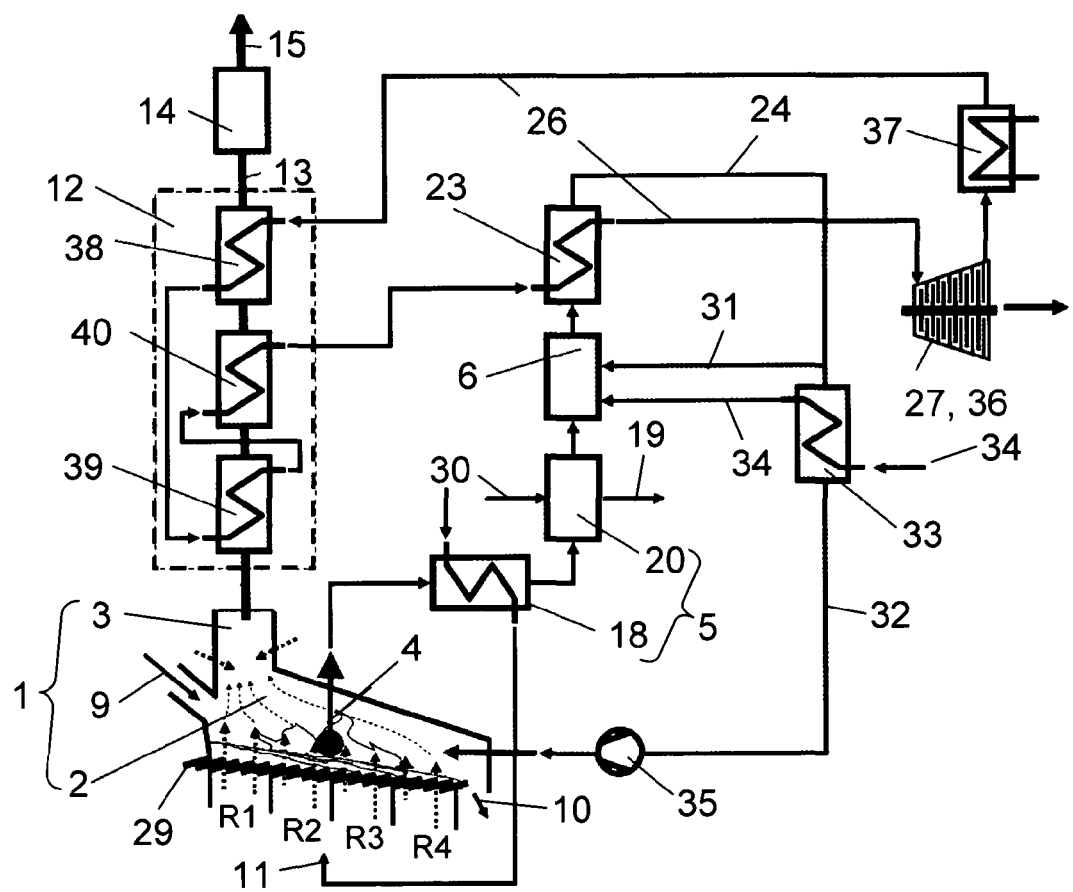
FIGS. 6a and b are schematic views showing another specific embodiment of a combustion system for solid fuels, including a two-stage primary combustion process and a separate secondary combustion, as well as a water/steam circuit including a single-stage steam turbine (a), as well as a T-S diagram for the water/steam circuit (b)

FIG. 6a shows a specific embodiment according to the generally described first exemplary embodiment (see FIG. 1), which uses a single-stage expansion turbine 36 and which, similar to the generally described first exemplary embodiment, includes a primary furnace 1 having a primary combustion chamber 2, a primary flue gas post-combustion chamber 3, a solid fuel inlet port 9, a slag discharge port 10 and a primary gas inlet 11, as well as a primary steam generator 12 and primary flue gas cleaning stages 14 for raw gas 13. In this specific embodiment, too, a portion of the combustion gases is subjected to a separate secondary combustion in a second secondary combustion train. The secondary combustion train includes a branch passage 4 for said portion of the combustion gases, the branch passage being located in combustion chamber 2 above the fixed-bed burnout zone on combustion grate 29, preferably above grate region R2/R3. Also preferably, a withdrawal means is provided in the region of the combustion chamber, where heating value $H_u$ of the combustion gas has its maximum (see exemplary embodiment 2, FIG. 2).

The partial combustion gas stream is conveyed from branch passage 4 to a heat exchanger 18 which uses primary air as a cooling medium. The primary air pre-heated in this manner is passed from below through combustion grate 29 into the primary combustion chamber.

As in the first exemplary embodiment, the combustion gas conditioner further includes at least one filter 20 adapted for removing suspended particles and having a solid-discharge port 19. Optionally, the conditioning of the combustion gas may also include introducing a neutralizing agent to remove acids.

The conditioned combustion gas converted to secondary combustion gas combustion chamber 6 for post-combustion, and the hot exhaust gas stream is transferred to a secondary steam superheater 23 of a water/steam circuit 26.

In this exemplary embodiment, the cooled exhaust gas 24 exiting from secondary steam superheater 23 is split up into a secondary partial gas stream 31 for operation and temperature control of secondary combustion gas combustion chamber 6 and into a second partial gas stream 32 which is recycled into combustion chamber 2. In addition or alternatively to first secondary partial gas stream 31, exhaust gas 24 may optionally be passed through an exhaust gas heat exchanger 33 for pre-heating a secondary gas stream 34. Recirculation of second partial gas stream 32 is accomplished by injecting it into primary combustion chamber 2 by means of a fan 35. This causes axial mixing within the combustion chamber over the regions of the combustion bed, which advantageously results in a more uniform combustion in combustion chamber 2.

Water/steam circuit 26 exits the above-mentioned single-stage expansion turbine 36 and passes to a condenser 37, in which the expanded wet steam is first liquefied, and from there returned by a boiler feed pump (not shown) to primary steam generator 12, which includes a preheater 38, an evaporator 39 and a presuperheater 40. The pre-superheated steam is then passed through superheater 23 of the secondary furnace, and from there back to expansion turbine 36.

Figure 6B:
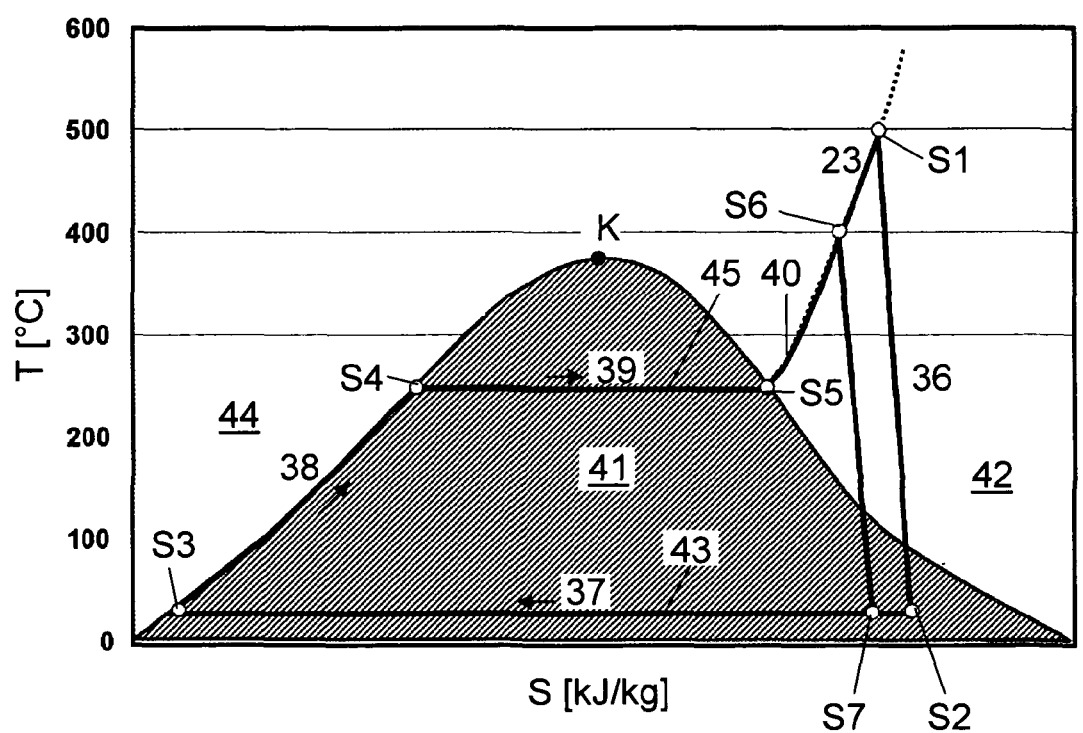

The temperatures T in ° C. and the state of aggregation of the water or steam at the aforementioned stations of the water/steam circuit can be traced via the entropy s in kJ/kg in a T/s diagram (cyclic process, FIG. 6b). K denotes what is known as the "critical point of water", below which wet steam region 41 is shaded gray. The particular stations according to FIG. 6a are represented in FIG. 6b by their steam parameters. At point S1, the expansion in expansion turbine 36 begins and passes from superheated steam region 42 to wet steam region 41 to point S2. Then, passage through condenser 37 occurs along a first isobaric line 43 (=isothermal line in the wet steam region) up to the liquid region 44 (point S3). Here, the pressure is increased by a boiler feed pump (not shown), which is followed by an isobaric passage through preheater 38 until the boiling point is reached in point S4. Subsequently, an isothermal passage 45 through the wet steam region in evaporator 39 occurs along this second isobaric line to point S5, followed by superheating in presuperheater 40 of the primary furnace up to point S6 and further in secondary steam superheater 23 of the secondary furnace to point S1.

It is generally known and does not need to be further explained that further superheating of steam from point S6 to point S1, as well as expansion to point S2 (instead of from point S6 to point S7) significantly increases the usable enthalpy difference, and thus the efficiency of the cyclic process. The efficiency η of gross electricity generation in a modern up-to-date waste incineration plant (grate combustion system) with a steam condition of 40 bar and an temperature of 400° C. at the entry to the expansion turbine (point S6) is about η=24% (for a boiler efficiency of, for example, 82%). Due to the aforementioned measures (utilization of the energy of a conditioned partial combustion gas stream by separate secondary combustion in conjunction with a significantly reduced corrosion potential), further superheating to above 400° C., e.g., to 500° C., is advantageously also possible during continuous operation. By superheating to 500° C. (point S1) alone, as proposed in the exemplary embodiment, the efficiency can be increased to 26.2%. When the steam is superheated to 550° C., the efficiency is 27%.

Exemplary Embodiment 4

Figure 7A:
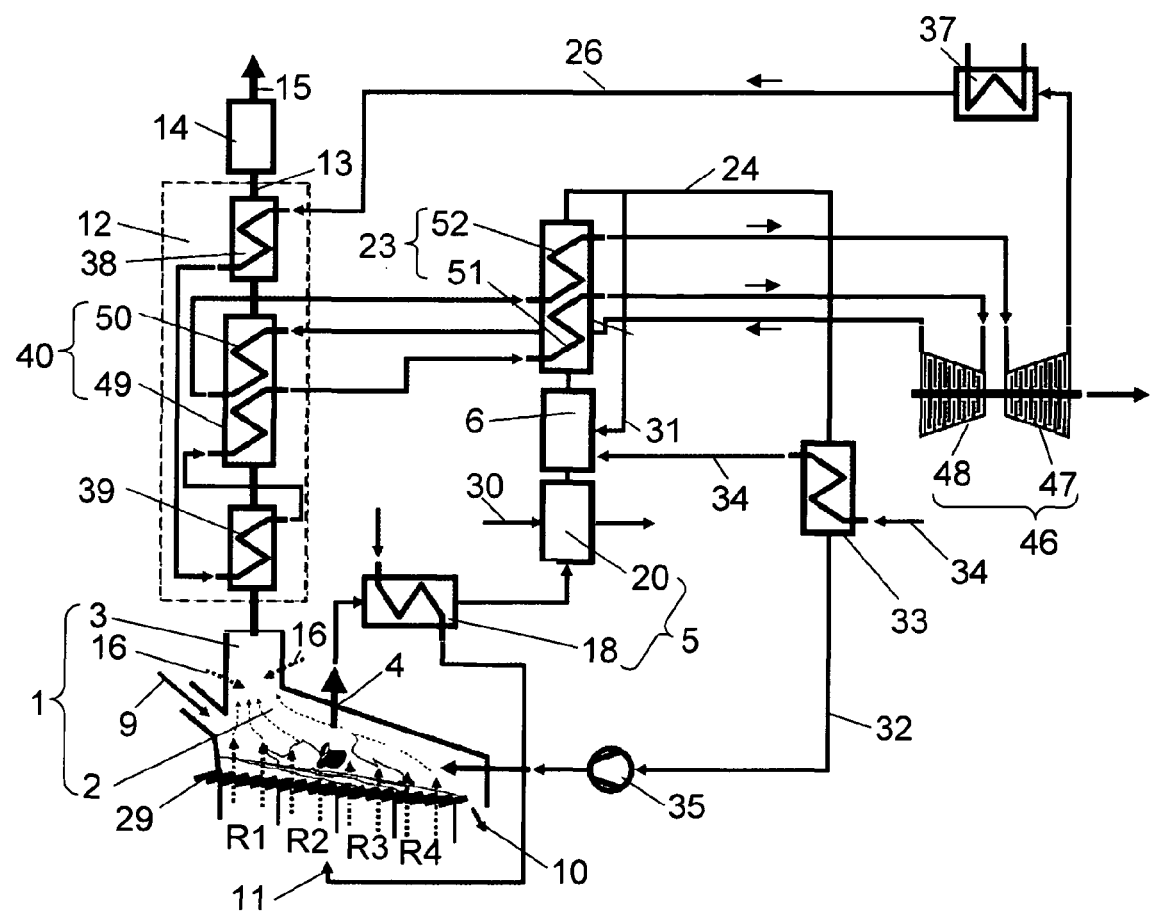
FIGS. 7a and b are schematic views showing another specific embodiment of a combustion system for solid fuels, including a two-stage primary combustion process and a separate secondary combustion, as well as a water/steam circuit including a single-stage reheater and a two-stage steam turbine (a), as well as a T-S diagram for the water/steam circuit (b)
Figure 7B:
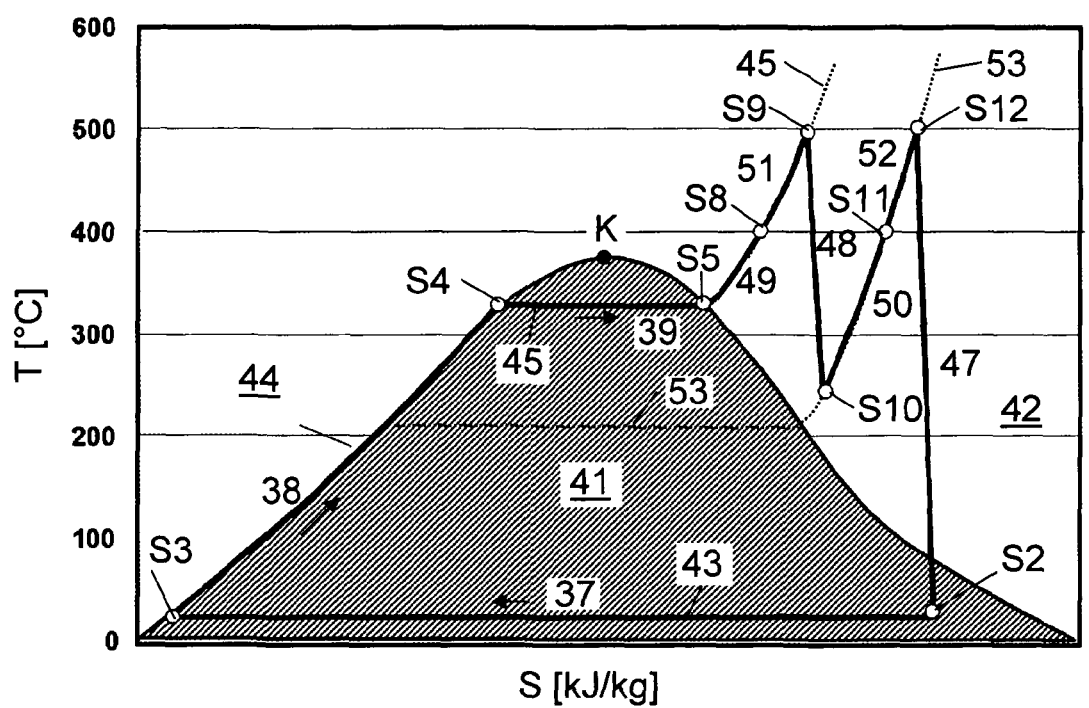

FIG. 7a shows another specific embodiment according to the generally described first exemplary embodiment (see FIG. 1), which uses a compound two-stage expansion turbine 46, including a low-pressure turbine 47 and a high-pressure turbine 48 and a reheater disposed therebetween. As for the basic design shown in FIG. 7a and the water/steam circuit (cyclic process) illustrated in the T-S diagram of FIG. 7b, reference is made to the commonalities with exemplary embodiment 3 (FIGS. 6a and b).

As in the preceding exemplary embodiment 3, the energy of the diverted partial combustion gas stream is recovered separately in a secondary steam superheater 23, while the non-diverted primary combustion gas stream (along with the recycled partial exhaust gas stream 24, 32 from the secondary furnace) is subjected to energy recovery in a primary steam generator 12. The present exemplary embodiment differs in that secondary steam superheater 23 and presuperheater 40 both have two stages, including a low-pressure section and a high-pressure section. Accordingly, water/steam circuit 26 exits low-pressure turbine 47 in point S2 (FIG. 7b), passes to a condenser 37, in which the expanded wet steam is first isobarically and isothermally liquefied along a first isobaric line 43 (FIG. 7b, S3), and from there returned by a boiler feed pump to primary steam generator 12, which includes a preheater 38, an evaporator 39 and a high-pressure presuperheater 49 forming part of presuperheater 40, and is then evaporated (isobarically, e.g., at 150 bar, along second isobaric line 45 through points S4 and 55, see FIG. 7b), and superheated to S8. The steam pre-superheated to about 400° C. (350 to about 420° C.) is then passed through high-pressure steam superheater 51 of secondary steam superheater 23 along the same isobaric line, and is passed at about 500° C. from there to high-pressure turbine 48 (point S9). In said high-pressure turbine, a first expansion to an intermediate pressure (point S10) takes place in the superheated steam region. Starting from that point, the temperature is initially increased to about 400° C. during a second low-pressure superheating process in low-pressure presuperheater 50 along a third isobaric line 53 to point S11 (at a pressure between the pressures of the first and second isobaric lines, for example at p=20 bar), followed by superheating to a temperature of about 500° C. in low-pressure steam superheater 52 of secondary steam superheater 23, from where the steam is directed to low-pressure turbine 47 (see point S12), where it is subsequently expanded to point S2.

Using a compound turbine and reheater in the manner described hereinabove, the efficiency η of gross electricity generation can be increased from the above-mentioned value of about η=24% to about 30%.

In exemplary embodiments 1 through 4, the efficiency can be further increased by about 1% by increasing the boiler efficiency. This is achieved by reducing the oxygen content in the flue gas of the primary furnace through additional flue gas recirculation to primary flue gas post-combustion chamber 3; i.e., by reducing the exhaust gas losses by reducing the excess of air. Moreover, a further increase in efficiency can be achieved by additional measures, such as by means of regenerative feed water heating.

In addition to this, a further increase in power generation efficiency can in general be achieved using the following, generally known measures:

reducing the condensing pressure downstream of the turbine, first isobaric line preferably below 5 bar, more preferably below 0.1 bar, more preferably between 0.01 and 0.05 bar.

conditioning the combustion gas in a manner so as to minimize to the extent possible the formation of pollutants in the overall combustion process as well as the pollutant emissions, so that exhaust gas cleaning can be performed using a simple system with little energy consumption.

selecting corrosion-resistant materials and/or high-temperature resistant materials as the boiler materials for energy recovery 7, in conjunction with superheating of the steam to temperatures above 500° C., preferably to 530, 550 or even 600° C.

Further Exemplary Embodiments

Figure 9:
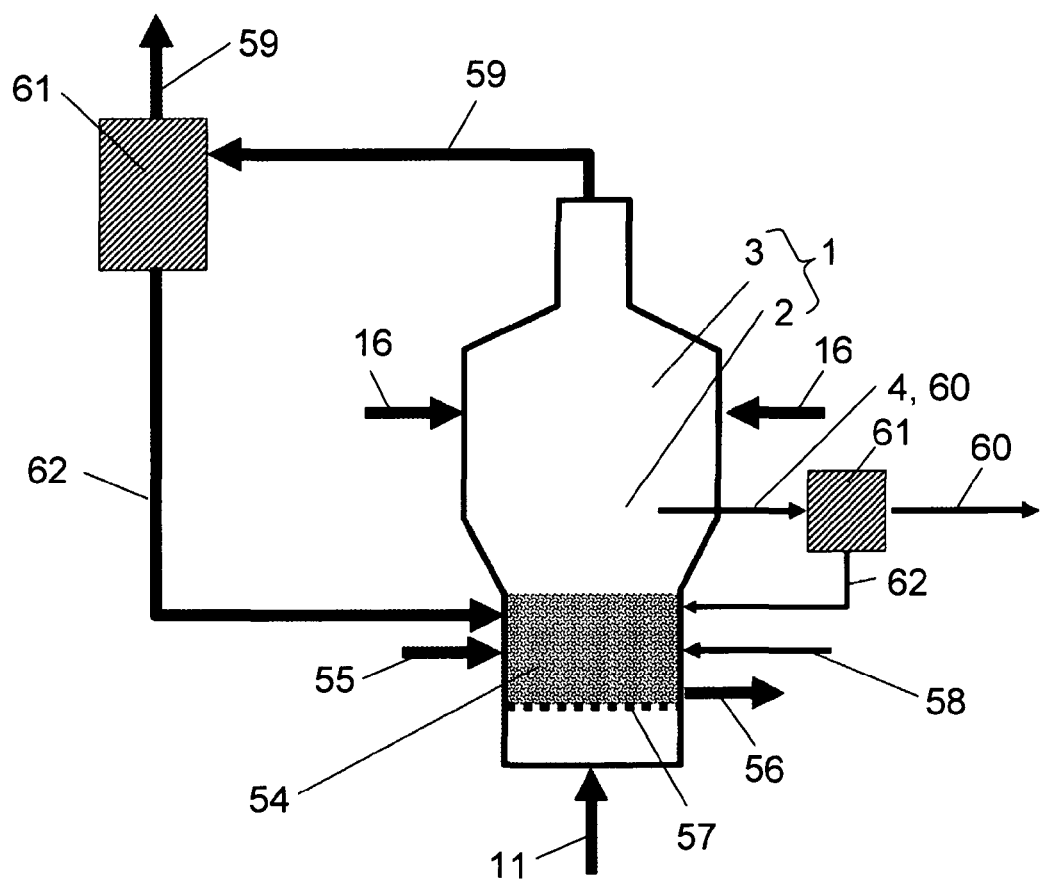
FIG. 9 is a schematic view of a primary combustion chamber having a combustion gas branch passage in a circulating fluidized-bed combustion system.

FIGS. 8 and 9 show embodiments that use stationary and circulating fluidized-bed combustion, respectively, in place of grate combustion. Primary furnace 1 includes a primary combustion chamber 2 above a moving bed of solid particles (fluidized bed 54) and a primary flue gas post-combustion chamber 3 having a secondary gas inlet 16. The substoichiometric combustion/gasification of the solid fuel (e.g., biomass, household waste, or substitute fuel, but also coal) takes place in fluidized bed 54, which is continuously renewed by, preferably jointly, introducing fuel and sand, as indicated by reference numeral 55, and by discharging combustion bed ash and sand, as indicated by reference numeral 56. Fluidized bed 54 is located above a nozzle bottom 57. An oxygen-containing primary gas 11 is introduced into the fluidized bed in substoichiometric amounts through the nozzle bottom over substantially the entire surface area. Branch passage 4 for withdrawing the high heating-value partial combustion gas stream is disposed in primary combustion chamber 2, preferably above fluidized bed 54, but below secondary gas inlet 16. Solid ash constituents and burned-out and energetically spent flue gas from the post-combustion bypass train are recirculated to the fluidized bed and/or to primary combustion chamber 2 upstream of secondary gas inlet 16, as indicated by reference numeral 58. The resulting exhaust gas atmosphere of the mixed flue/exhaust gas streams upstream of primary flue gas post-combustion chamber 3 is preferably reducing. The circulating fluidized bed of FIG. 9 differs from the stationary fluidized bed of FIG. 8 in that sand and coarse ash are separated from flue gas stream 59 and partial combustion gas stream 60 and recycled to fluidized bed 54, as indicated by reference numeral 62. To this end, the aforementioned solid particles are separated in cyclones 61, one for each of said gas streams.

In general, this method is also applicable to rotary kiln combustion systems. The diversion of a portion of the combustion gas and the recirculation of exhaust gas are effected in the post-combustion chamber upstream of the secondary air inlet, analogously to fluidized-bed systems.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS 1 primary furnace
2 primary combustion chamber
3 primary flue gas post-combustion chamber
4 branch passage
5 combustion gas conditioner
6 secondary combustion gas combustion chamber
7 energy recovery means
8 outlet
9 solid fuel inlet port
10 slag discharge port
11 primary gas inlet
12 primary steam generator
13 raw gas
14 primary flue gas cleaning stages
15 clean gas
16 secondary gas inlet
17 combustion gas stream
18 heat exchanger
19 solid-discharge means
20 filter for suspended particles
21 flue gas recirculation loop
22 flue gas stream
23 secondary steam superheater
24 exhaust gas
25 combustion grate length
26 water/steam circuit
27 steam turbine
28 raw gas recirculation loop
29 combustion grate
30 neutralizing agent feed line
31 secondary partial gas recirculation stream
32 partial exhaust gas recirculation stream
33 exhaust gas heat exchanger
34 secondary gas stream
35 fan
36 single-stage expansion turbine
37 condenser
38 preheater
39 evaporator
40 presuperheater
41 wet steam region
42 superheated steam region
43 first isobaric line
44 liquid region
45 second isobaric line
46 compound expansion turbine
47 low-pressure turbine
48 high-pressure turbine
49 high-pressure presuperheater
50 low-pressure presuperheater
51 high-pressure steam superheater 52 low-pressure steam superheater
53 third isobaric line
54 fluidized bed
55 bed material feeder 55
56 bed residue discharge means
57 nozzle bottom
58 recirculation line
59 flue gas stream
60 partial combustion gas stream
61 cyclone
62 recirculation line
63 suction bell
64 suction tube
65 gap

What is claimed is:

1. A method for reducing pollutant emissions in a combustion system using a two-stage primary combustion process for a fuel including at least one of a solid fuel and a solid fuel mixture, the system including a primary furnace having a primary combustion chamber, a solid fuel burnout zone, a primary flue gas post-combustion chamber, and primary and secondary exhaust stream pathways, each connecting the primary combustion chamber with the primary flue gas post-combustion chamber, and including a separate secondary combustion train, the method comprising:
burning the fuel in a primary combustion chamber while supplying primary gas in a substoichiometric amount so as to form a high heating-value combustion gas and a low-carbon solid residue;
diverting a partial stream of the formed high heating-value combustion gas and passing a remainder of the formed high heating-value combustion gas to the primary flue gas post-combustion chamber via the primary exhaust stream pathway;
passing the diverted second combustion gas stream to the secondary combustion train via the secondary exhaust stream pathway, the secondary combustion train including a combustion gas conditioner, a secondary combustion gas combustion chamber, and an energy recovery device, the passing being performed so as to:
reduce, in the combustion gas conditioner, a temperature of the diverted partial stream in a temperature control device including at least one of a heat exchanger and a quench, and then
clean, in the combustion gas conditioner, the diverted partial stream by removing at least one of ash, soot particles, and corrosive gas components in a downstream filter, and then
burn the diverted partial stream in the secondary combustion gas combustion chamber while supplying oxygen-containing gas so as to produce hot, low-corrosive exhaust gases, and then
recover, in the energy recovery device, energy from the hot, low-corrosive exhaust gases so as to produce burned-out energy-spent exhaust gas;
recirculating the energy-spent exhaust gas to the primary furnace upstream of the primary flue gas post-combustion chamber via the secondary exhaust stream pathway and burning, in the primary flue gas post-combustion chamber, the energy-spent exhaust gas from the secondary exhaust stream pathway and the remainder of the high heating-value combustion gas stream from the primary exhaust stream pathway while adding an oxygen-containing secondary gas in superstoichiometric amounts so as to produce a primary exhaust gas; and
feeding the primary exhaust gas to a primary steam generator and a primary flue gas cleaning unit.

2. The method recited in claim 1, wherein the burning includes burnout of the solid fuel carried out in the solid fuel burnout zone of the primary furnace on a grate, in a fluidized bed or in a rotary kiln.

3. The method recited in claim 1, further comprising generating steam in the primary steam generator, and passing the steam through a secondary steam superheater of the energy recovery device so as to superheat the steam with energy recovered from the low-corrosive exhaust gases.

4. The method recited in claim 1, wherein a temperature of the burned out energy-spent exhaust gas is above a temperature of the diverted partial stream downstream of the combustion gas conditioner.

5. The method recited in claim 1, further comprising controlling a temperature and a thermal power of the secondary combustion gas combustion chamber by controlling a mass flow rate of at least one of the high heating value combustion gas of the diverted partial stream, the oxygen containing gas and a recycled exhaust gas.

6. The method recited in claim 1, further comprising controlling a temperature and a thermal power of the secondary combustion gas combustion chamber by controlling a mass flow ratio between at least two of the high heating value combustion gas of the diverted partial stream, the oxygen containing gas and a recycled exhaust gas.

7. The method recited in claim 1, wherein the oxygen containing gas supplied to the secondary combustion gas combustion chamber is preheated.

8. The method recited in claim 1, wherein the temperature of the diverted partial stream is cooled to within a range between 350 and 500° C. in the temperature control device and, as a result, process gaseous volatile alkali and metal compounds are at least one of sublimated into solid particles and condensed on fly ash particles so as to form removable particles.

9. The method recited in claim 8, wherein the cleaning the diverted partial stream includes removing the removable particles by filtration at temperatures in a range of 350 to 500° C.

10. The method recited in claim 1, wherein the cleaning the partial diverted stream includes removing halogen acids by introducing metered amounts of at least one of alkali- and alkaline-earth-containing neutralizing agents into the partial diverted stream so as to form a solid reaction product, and removing the solid reaction product.

11. The method recited in claim 10, wherein the neutralizing agents include at least one of calcium hydroxide, calcium oxide and calcium carbonate.

12. The method recited in claim 1, wherein the cleaning the partial diverted stream includes removing halogen acids by passing the partial diverted stream through at least one of a fixed-bed absorber and a layer of absorbing particles.

13. The method recited in claim 1, wherein the cleaning the partial diverted stream includes removing halogen acids by controlling a mass flow rate of a neutralizing agent through a feed line based on a halogen acid concentration of the diverted partial stream, the cleaning the partial diverted stream being free of any process targeting removal of hydrogen sulfide so as to reduce a ratio of $HCl/SO_2$ in the hot, low-corrosive exhaust gases and in the primary exhaust gas.

14. The method recited in claim 1, wherein the recirculating is preformed so as to mix energy-spent exhaust gas and the remainder of the high-heating value combustion gas stream upstream of the primary flue gas post-combustion chamber, a reducing atmosphere being present in the primary flue gas post-combustion chamber so as to reduce nitrogen oxides formed in the secondary combustion gas combustion chamber to nitrogen.

15. A device for reducing pollutant emissions in combustion systems for solid fuels using a two-stage combustion process in a primary furnace, the device comprising:

the primary furnace including a solid fuel burnout zone, a primary combustion chamber, a primary flue gas post-combustion chamber, and primary and secondary exhaust stream pathways, each connecting the primary combustion chamber with the primary flue gas post-combustion chamber; and a secondary combustion train configured to receive via the secondary exhaust stream pathway a partial stream of high heating-value combustion gases formed by burning the solid fuel, the secondary combustion train including:
a downstream combustion gas conditioner configured to receive the partial stream and including at least one temperature control device selected from the group of a heat exchanger and a quench, and a filter,
a downstream secondary combustion gas combustion chamber configured to receive the partial stream and configured to receive an oxygen-containing secondary gas,
an energy recovery device, and
a downstream outlet for discharging via the secondary exhaust stream pathway the partial stream into the primary flue gas post-combustion chamber,
wherein the primary flue gas post-combustion chamber is configured to receive a remainder of the high heating-value combustion gases from the primary combustion chamber via the primary exhaust stream pathway.

* * * * *